United States Patent [19]

Doerfel et al.

[11] Patent Number: 4,744,761
[45] Date of Patent: May 17, 1988

[54] REMOTE ACTUATION SYSTEM

[75] Inventors: Stephen Doerfel, Meers; Anthony G. Pokorny; Howard H. Rubin, both of Lawton, all of Okla.

[73] Assignee: L B & M Associates, Inc., Lawton, Okla.

[21] Appl. No.: 47,293

[22] Filed: May 6, 1987

Related U.S. Application Data

[62] Division of Ser. No. 753,668, Jul. 9, 1985, Pat. No. 4,682,953.

[51] Int. Cl.$^4$ .............................................. F41G 1/00
[52] U.S. Cl. ..................................... 434/16; 273/371
[58] Field of Search ....................... 434/16, 20, 21, 22; 273/310, 311, 371

[56] References Cited

U.S. PATENT DOCUMENTS

| | | | |
|---|---|---|---|
| 3,104,478 | 9/1963 | Strauss et al. | 273/310 |
| 3,434,226 | 3/1969 | Schaller | 434/22 |
| 3,646,580 | 2/1972 | Fuller et al. | 343/6.5 R |
| 4,545,583 | 10/1985 | Pearman et al. | 273/311 |

OTHER PUBLICATIONS

Curran and Scrupski, "Lasers to keep GIs on Target", *Electronics*, Jun. 23, 1977, pp. 96–97.

Keating and Gammarino, "An Advanced Combat Training System Using Laser Simulation", *National Defense*, May, 1982, pp. 31, 32, 38.

"Indirect/Area Fire Weapons Effect Simulation Summary", pp. i–iv, 3–7, 6–1, D–½, D–i, D–ii, D–3 through D–29 and D–31 through D–44.

*Primary Examiner*—Leo P. Picard
*Attorney, Agent, or Firm*—Laney, Dougherty, Hessin & Beavers

[57] ABSTRACT

A remote actuating system, specifically adapted for replicating indirect fire support in a battlefield environment and simulating the effectiveness of the fire support, includes transmitting control signals in response to a selected type of ammunition and a selected target area, transmitting a plurality of radio waves across the selected target area in response to the control signals, and indicating what at the selected target area could have been hit by the selected ammunition had it actually have been fired. The steps are performed utilizing a master station located near the weapon whose fire is to be replicated, a plurality of remote actuators located closer to the target area, and a plurality of indicator units associated with the objects which can be potentially hit in the affected zone within the target area. The master control station, the remote actuators, and the indicator unit can be more generally utilized, such as with a global positioning system, to define a remote actuation system for performing a desired operation. This system provides a method adaptable for defining a realistic geographical zone within a geographical target area by actuating at least three remote actuators to transmit respective radio waves so that the waves sweep a common region within the target area, thereby defining the affected geographical zone.

8 Claims, 14 Drawing Sheets

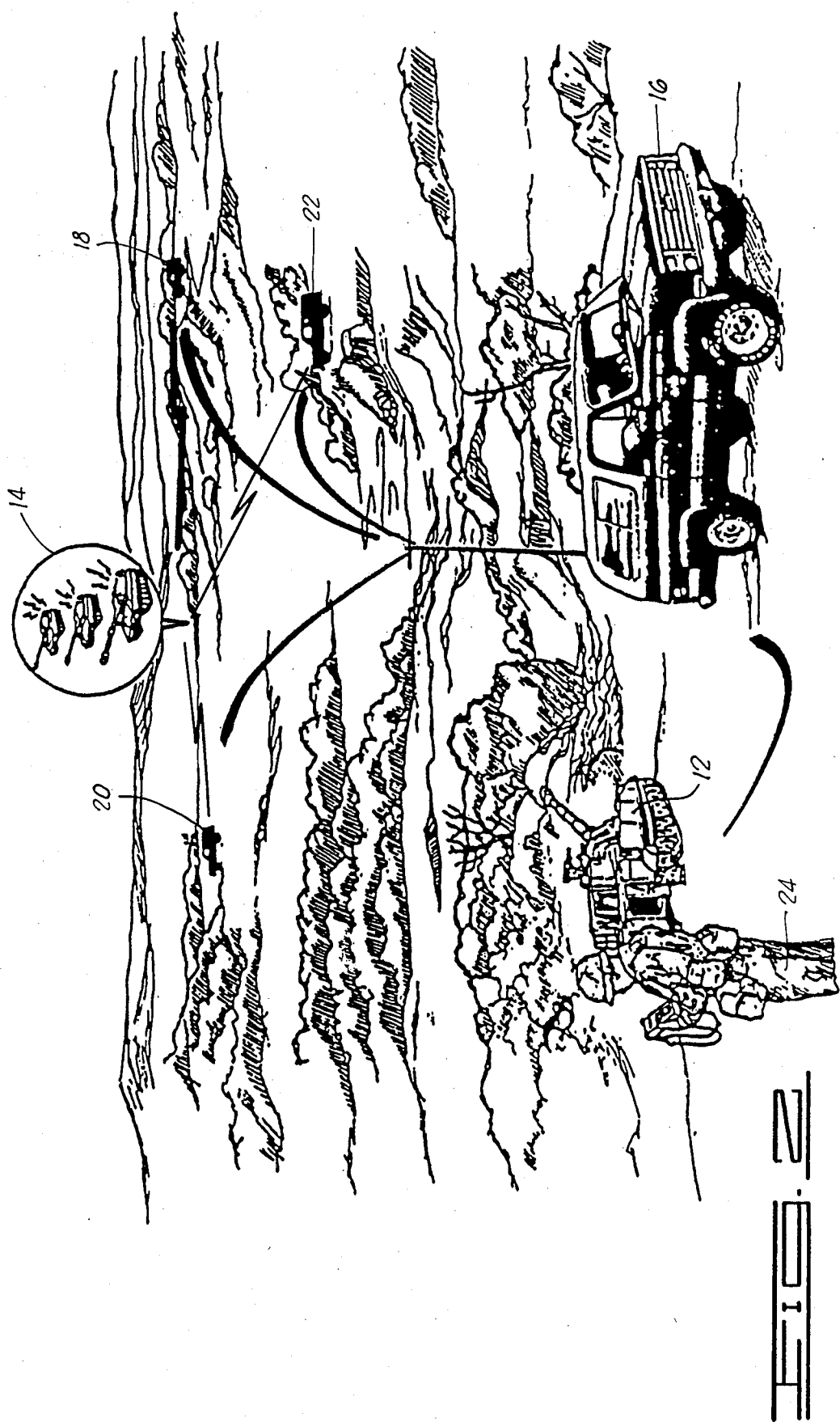

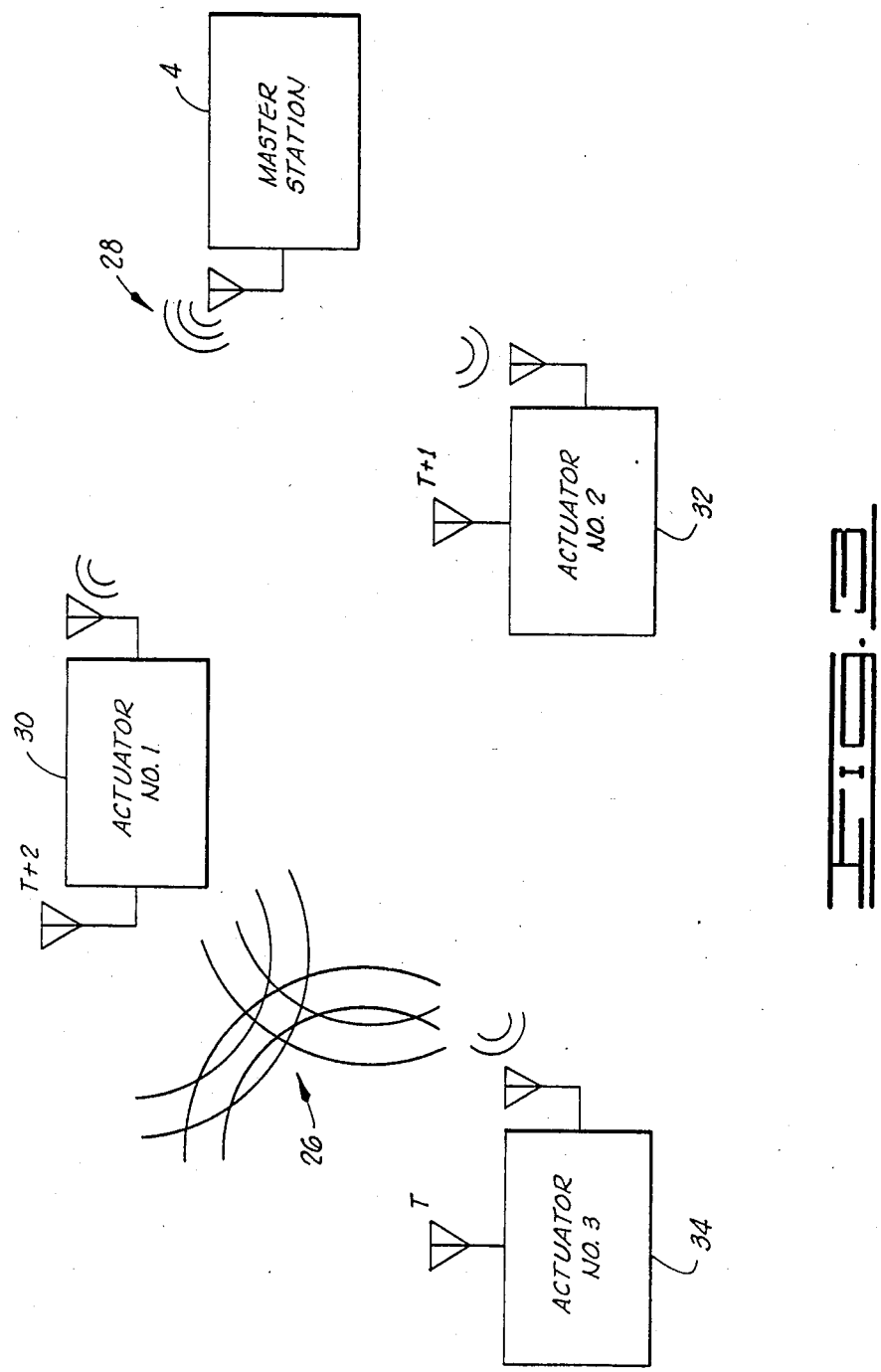

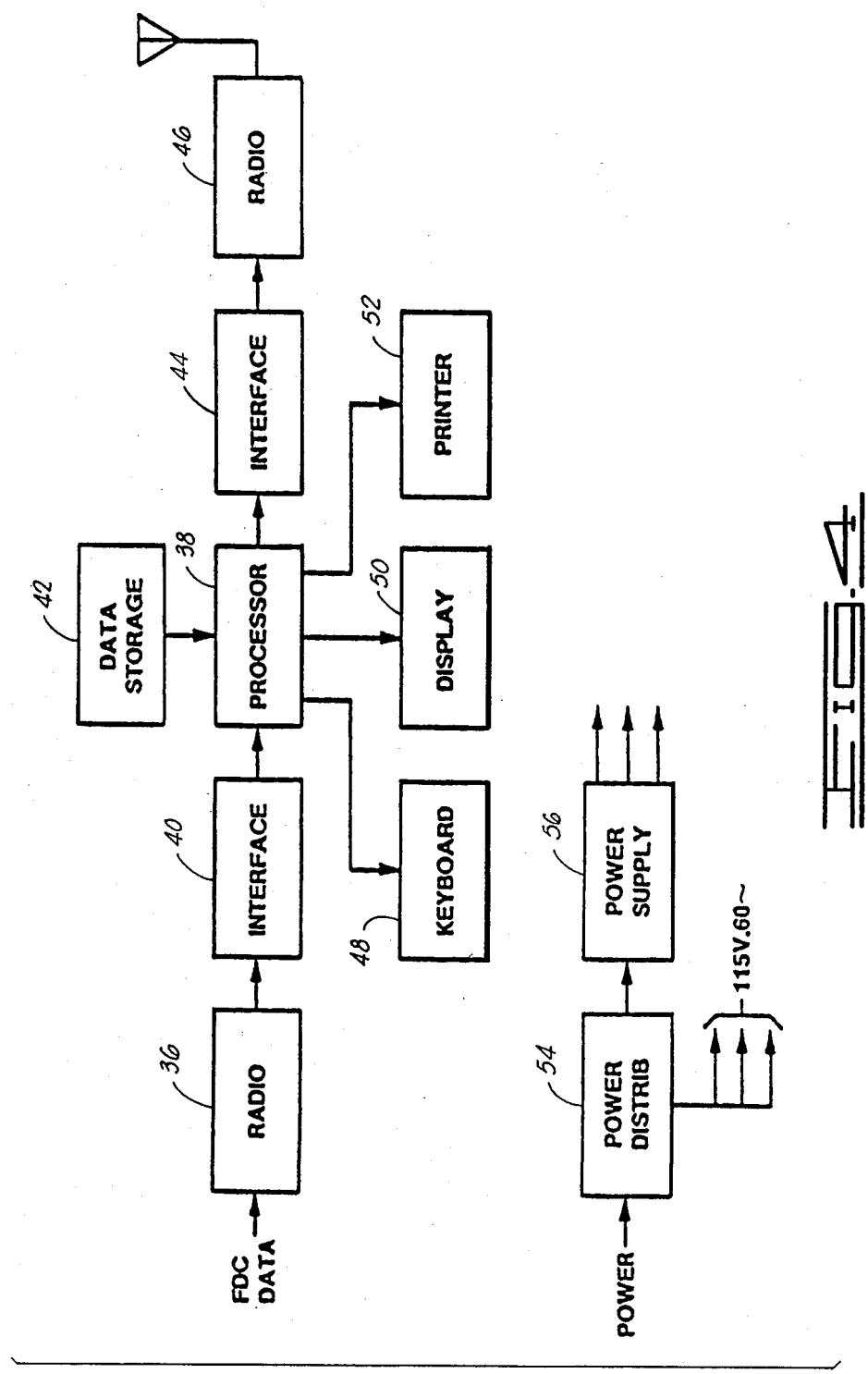

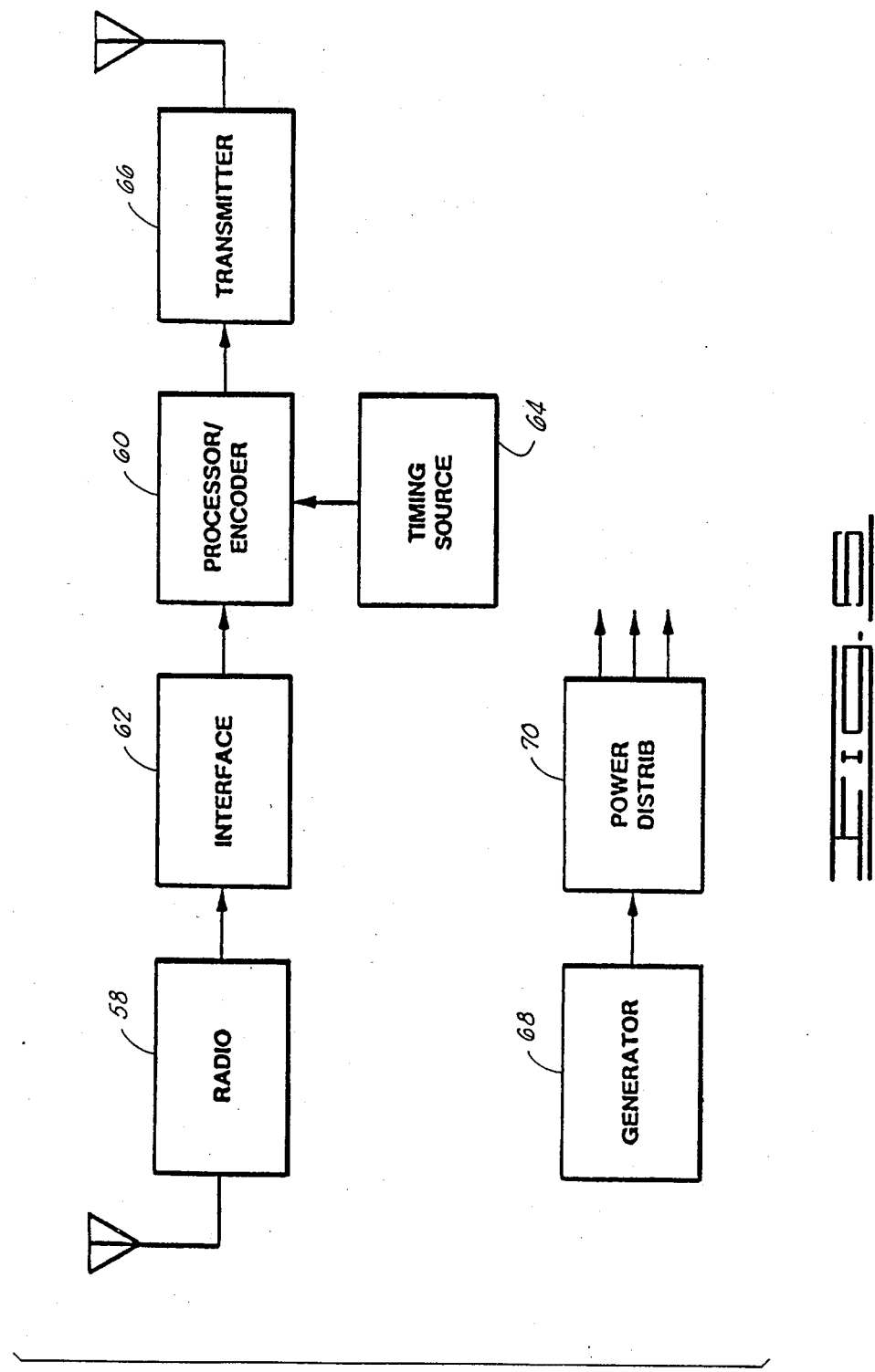

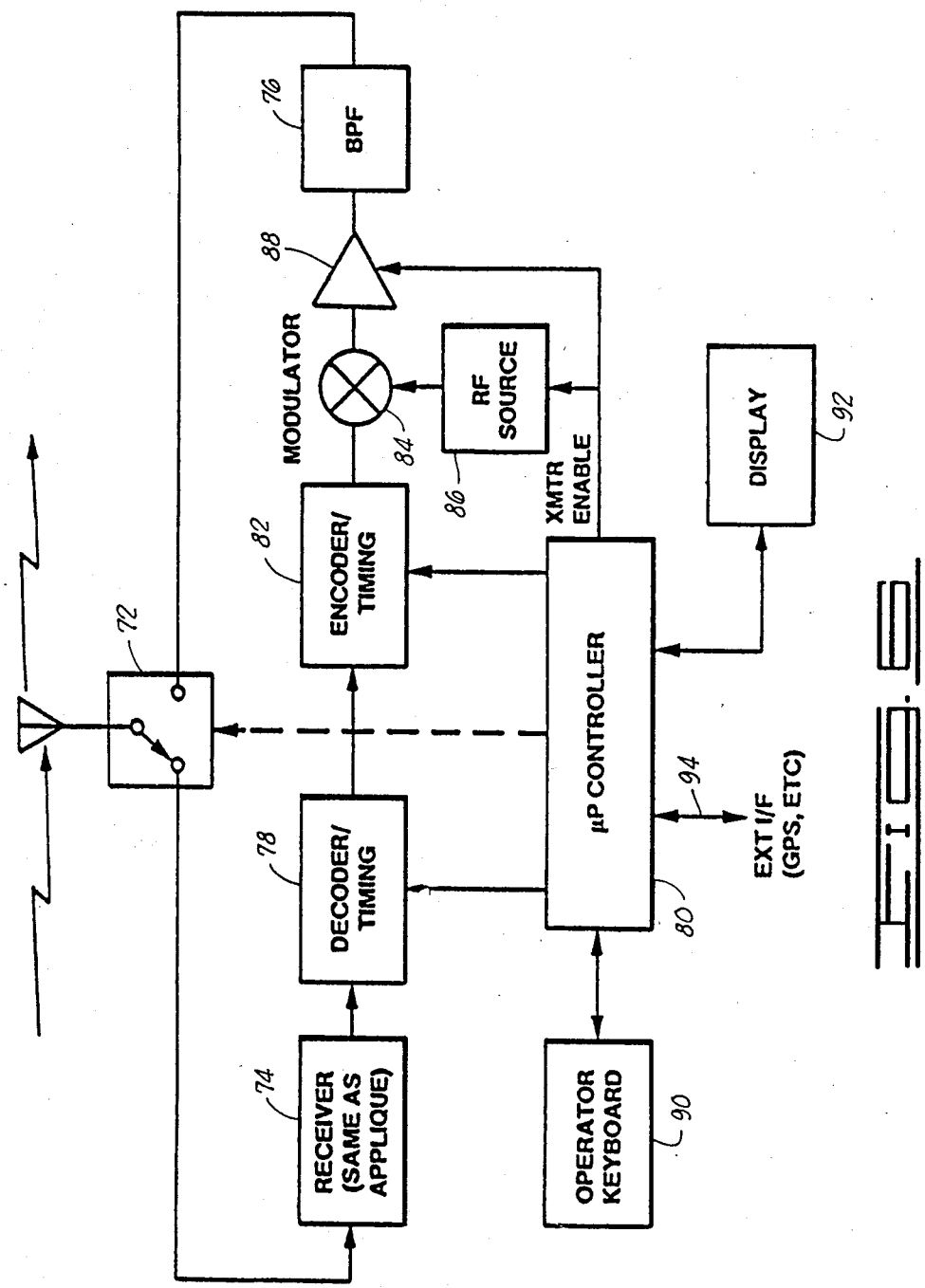

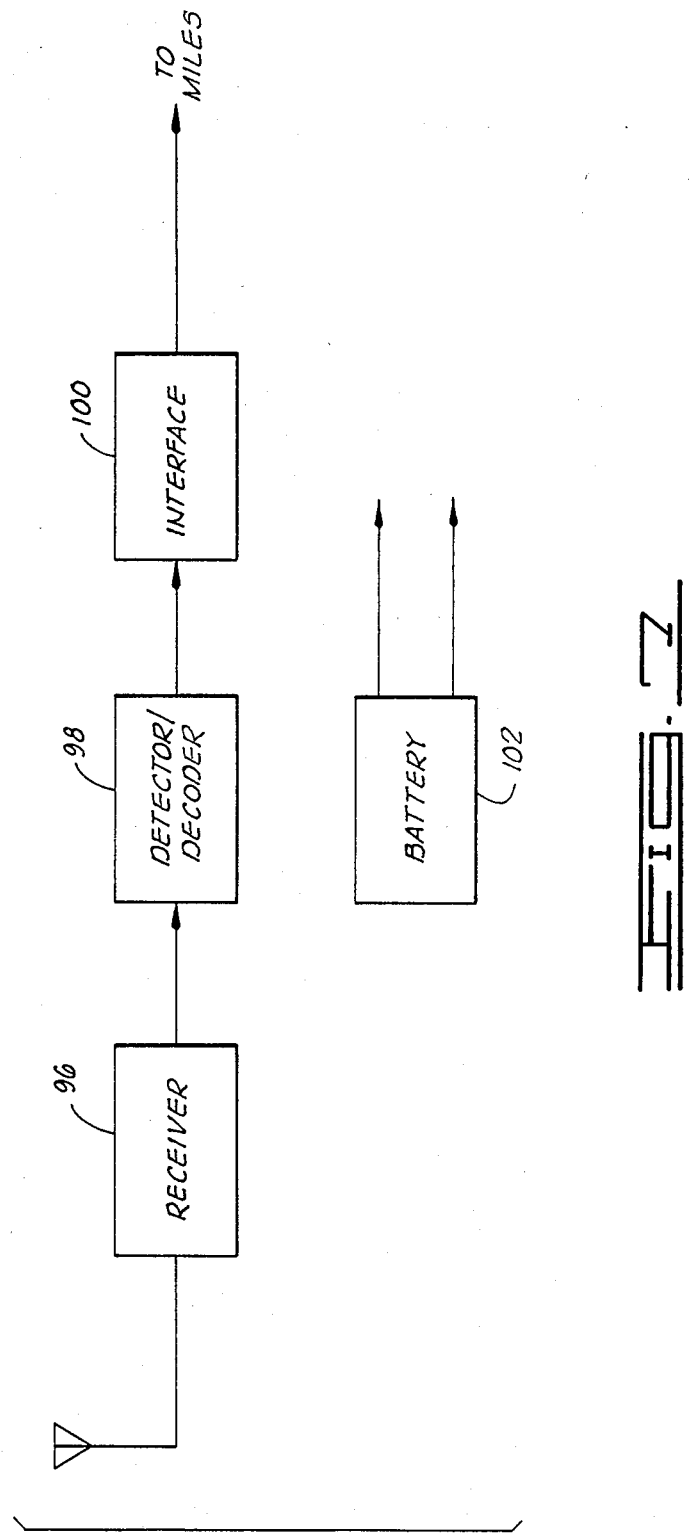

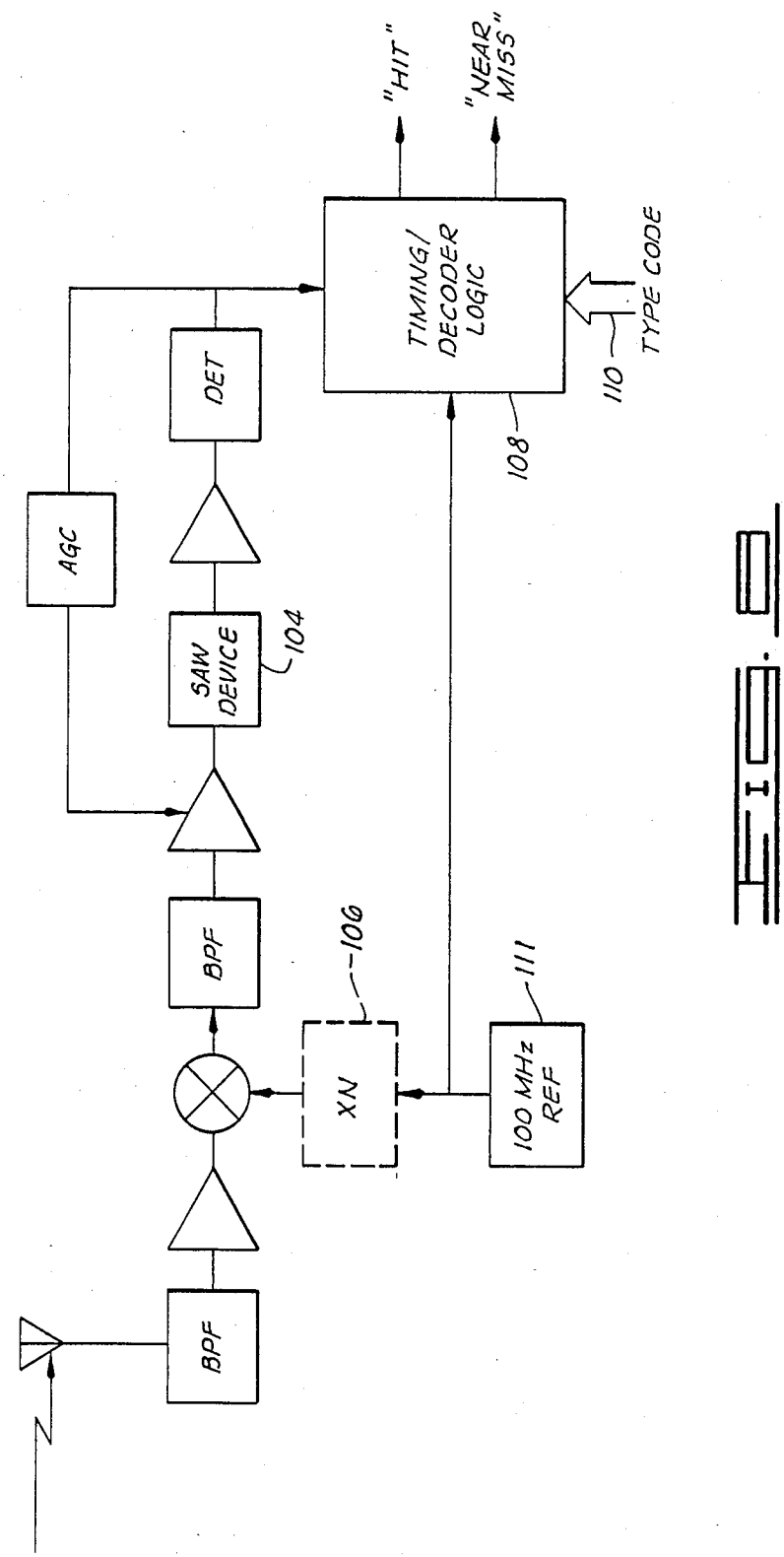

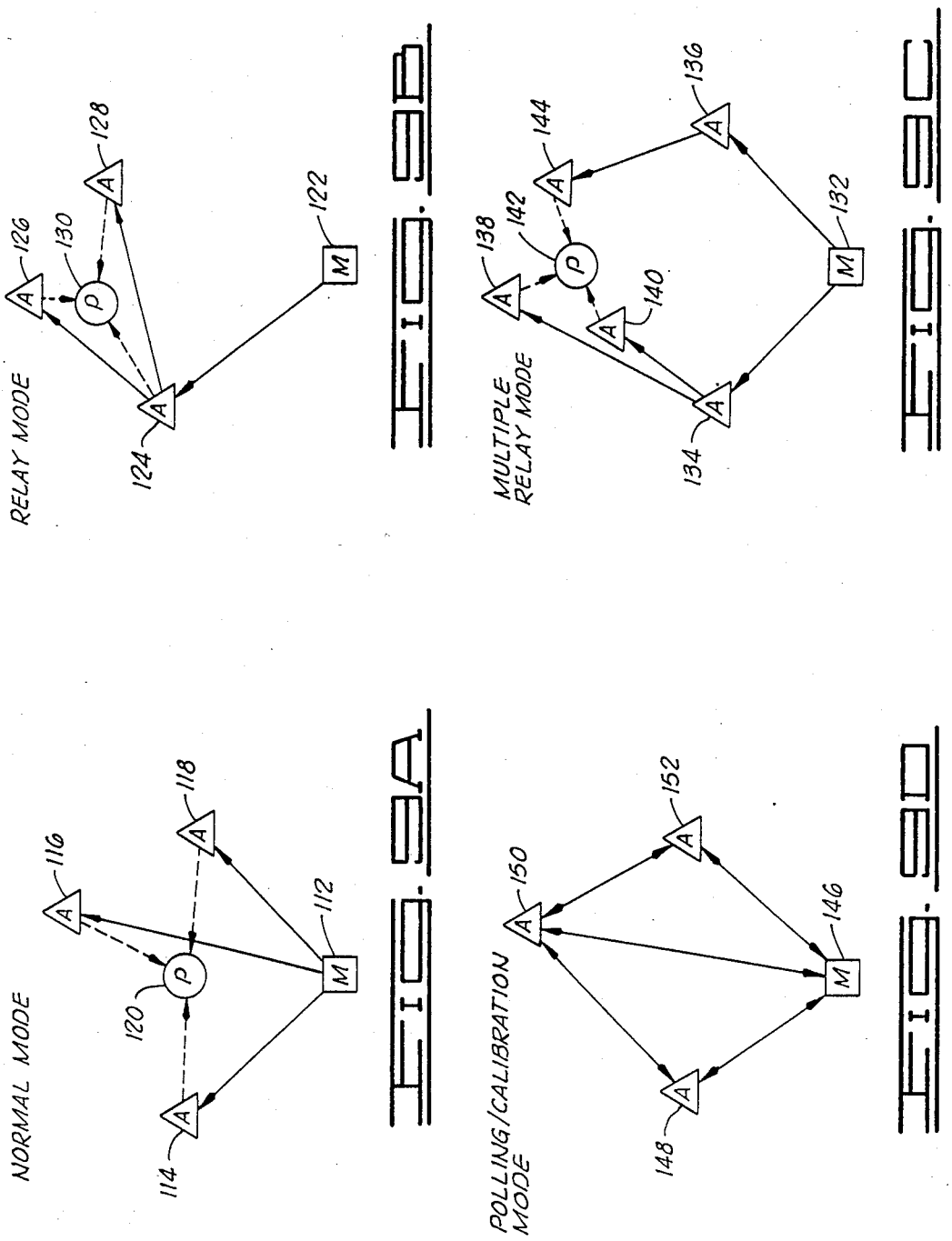

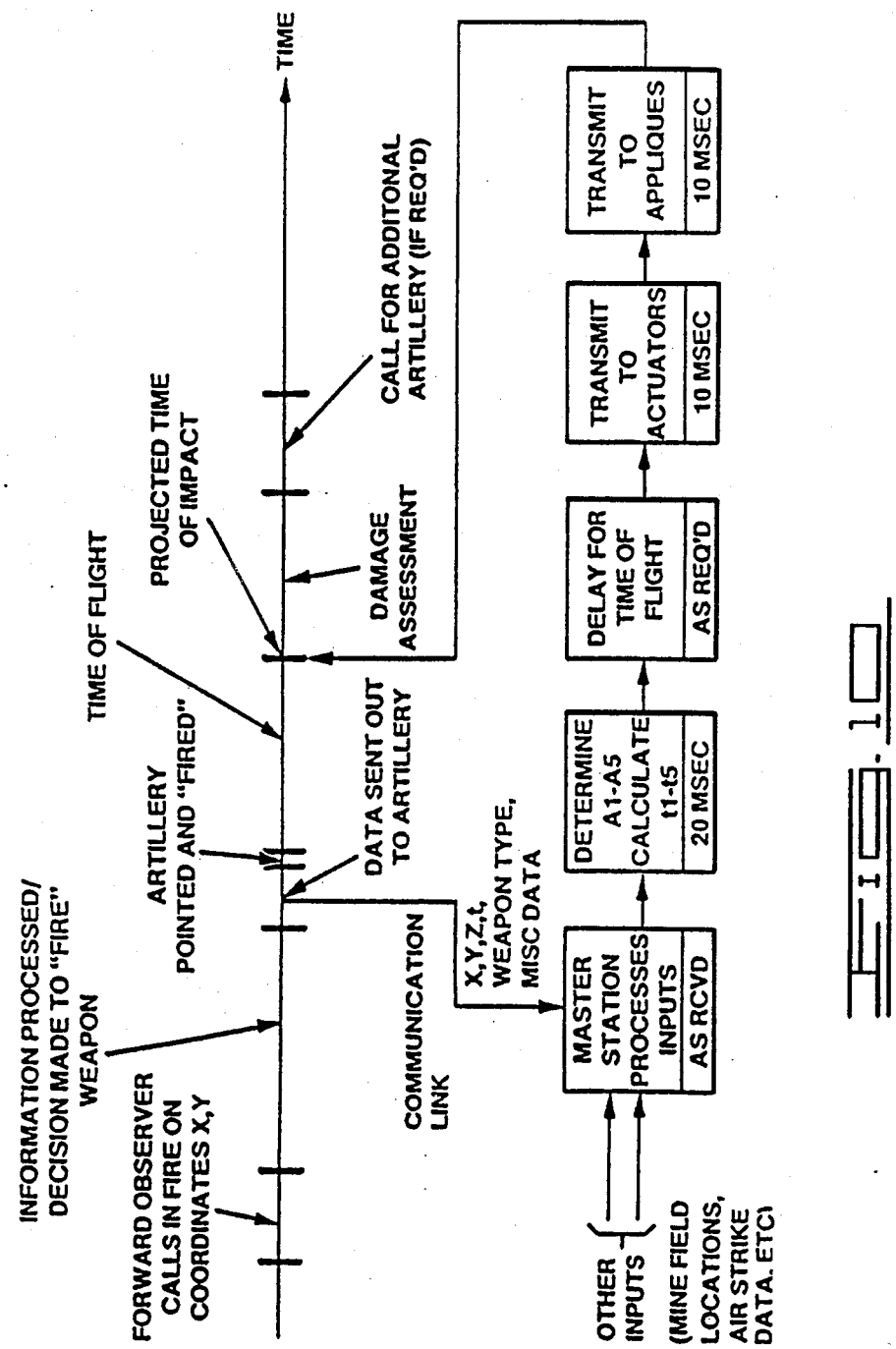

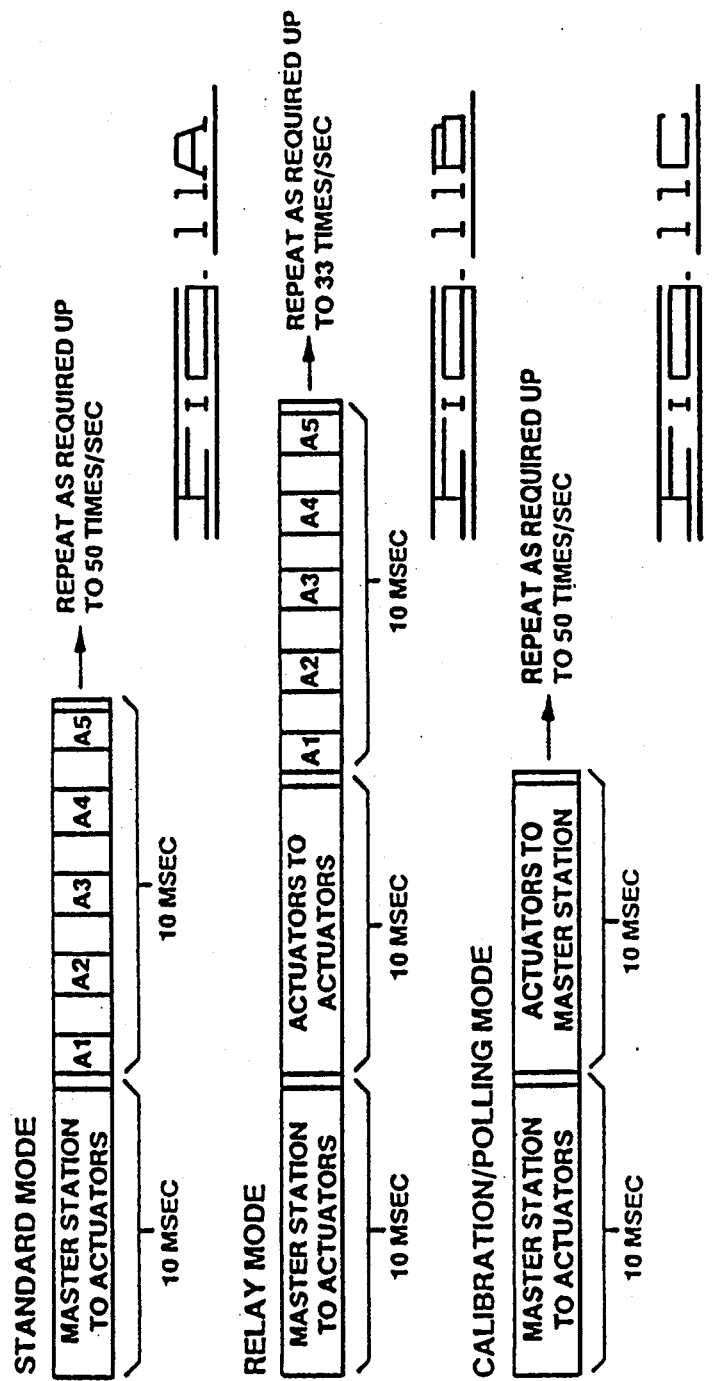

REMOTE ACTUATION SYSTEM

This is a divisional of co-pending application Ser. No. 753,668 filed on July 9, 1985 now U.S. Pat. No. 4,682,953.

BACKGROUND OF THE INVENTION

This invention relates generally to remote actuation systems and more particularly, but not by way of limitation, to a system for designating an affected zone within a target area, which system specifically includes a method and an apparatus for simulating the effectiveness of a selected ammunition within a selected actual geographical target area.

In the military there is the need to employ lethal weapons in a non-lethal manner so that equipment and personnel can be trained in realistic battle environments without the risk of being damaged or injured. This ability to realistically train is one of the highest priority missions of the United States armed forces so that personnel can be realistically trained to survive in battle rather than to be killed, which latter result is believed by some to be the result of training exercises in which personnel are not immediately and individually advised of the effect of some action in the staged battle.

At present, there is a laser-based training system, referred to as multiple integrated laser engagement system (MILES), wherein direct, line-of-sight fire between soldiers or between tanks (generally referred to as point targets) can be replicated or simulated. With this prior system, a laser apparatus on each weapon is activated to produce a laser beam directed at the point target when the trigger on the weapon is pulled. If the laser beam strikes a sensor on the target, the target's weapon is disabled by a disabling unit carried by the target, thereby immediately indicating that the target has been hit. This has proved to be a useful system; however, its usefulness is limited to direct fire, visual line-of-sight actions so that the laser can be used without interference. Therefore, there is the need for a system which can replicate or simulate the real-time effect of indirect fire, such as artillery fire, which covers an area target on the ground for the purpose of affecting any point targets which happen to be within the target area, thereby enabling combined arms battles to be staged for realistically training personnel.

This need for some type of indirect fire simulating system has long been recognized; however, we are unaware of any suitable solution which has been favorably received by the potential users. One earlier proposal has suggested that satellites be used for receiving signals from the remote location where the indirect firing weapon is located and then for sending signals to the target area. Such a proposal is technologically sophisticated; however, it is too expensive and requires a sensing device too heavy for personnel to carry and still be able to properly maneuver in a realistic training environment.

Another proposal relies upon relatively simple technology which is inexpensive, but it provides an unrealistic effect. This proposal provides that a foam rubber bullet be launched by a mortar-type device. The bullet is to be detonated in the air to send an acoustic signal which can actuate the presently used MILES sensors carried by the personnel and equipment within the target area.

Prior to and during the conception of the present invention, we contemplated some type of system which used lasers or microwave radiation. However, these forms of transmission are not suitable for the flexible type of system we desired. For example, both lasers and microwaves can be adversely affected by the environment where the training is to occur, such as by foliage that is found in battles conducted in wooded areas.

Therefore, there is the general need for a system which simulates the effectiveness of multiple types of weaponry, particularly indirect munitions such as artillery fire, to provide a combined arms simulation technique useful in training military units in various battle environments. In meeting this need, other desirable goals to be achieved include constructing the system so that it can be used with the MILES system presently used for direct fire replication. Another goal is for such a system to be constructed utilizing government-furnished equipment and non-developmental items to reduce the cost. To also reduce costs, the system should require minimum personnel and training to operate. Use of such a system should be available for all sizes of military units, such as from the platoon through corps; and use by such units should not interfere with their normal operation (e.g., use of the system should not alter the realism with which a battle is simulated). Such a system should also be operational in various types of environments where the fire to be replicated can occur (e.g., rain, fog, mountains, forests).

SUMMARY OF THE INVENTION

The present invention overcomes the above-noted and other shortcomings of the prior art by providing a novel and improved remote actuation system specifically adaptable for use in replicating combined arms fire support for use in training military units. This system simulates the effectiveness of various types of munitions on various types of targets; in particular, it defines a realistic zone affected by indirect fire and specifies whether objects (i.e., point targets) within the zone have been hit. In the preferred embodiment, the present invention is interfaced with the MILES system to provide a complete training package therewith. The system can be partially constructed with government-furnished equipment, such as currently used military vehicles and radios and the sensors used in the MILES system. The system can also be constructed with non-developmental items commercially available. The system requires minimum personnel and training to operate, and the system can be used for various sizes of military units without interferring with their normal operations. The preferred embodiment of the present invention utilizes radio frequency signals, thereby permitting the system to be used in various types of environments.

It is also contemplated that the present invention in its broader aspects will be useful for simulating other types of weaponry, such as chemicals. It is also contemplated that the present invention can be used to test new systems to evaluate their utility before production. Still another contemplated application of the present invention is a remote actuation system, specifically one which can be interfaced with the global positioning system (GPS).

In the preferred embodiment, the system of the present invention provides a method of simulating, within a selected target area, the effectiveness of a selected type of ammunition, comprising the steps of transmitting control signals in response to the selected type of ammunition and the selected target area; transmitting, in response to the control signals, a plurality of radio waves across the selected target area; and indicating, in response to the radio waves, what at the selected target area could have been hit by the selected ammunition had it actually been fired at the selected target area. More particularly, this method includes detecting which type of ammunition is selected to be fired; detecting which target is selected to receive the selected ammunition; transmitting to the selected target signals designating the selected ammunition; and identifying at the selected target specific equipment and personnel affected by the selected ammunition.

The system of the present invention also broadly provides apparatus for performing the aforementioned functions. In particular, this apparatus includes a portable indicator apparatus for detecting when an object at the target area has been hit by replicated indirect ammunition fire. The portable indicator apparatus comprises radio frequency receiver means, attached to the object, for receiving radio frequency actuating signals; decoder means for determining if the radio frequency actuating signals designate that the object has been hit; and means, responsive to the decoder means, for signifying when the object has been hit by the replicated ammunition fire. This means for signifying more particularly includes the disabling means of the MILES system carried by each object within the target area, and interface means for interfacing the decoder means with this disabling means.

In its broader uses, the present invention provides a method of electronically defining a realistic geographical zone, within a geographical target area, which is affected by the replicated firing of a selected type of ammunition into the target area. This method comprises the steps of placing a plurality of radio frequency transmitters in electronic line-of-sight communication with the target area and actuating at least three of the transmitters to transmit respective radio frequency waves so that the waves cover a common substantially elliptical region within the target area, thereby defining the affected geographical zone.

In its general function as a remote actuation system, the present invention comprises master control means for generating a master control signal specifying an operation to be performed; remote actuator means, movably spaced from the master control means, for generating an actuation signal in response to the master control signal and for communicating with a global positioning system or any other location determination device or method so that the position of the remote actuator means is determinable; and means for performing the operation in response to the actuation signal.

Therefore, from the foregoing, it is a general object of the present invention to provide a novel and improved remote actuation system. Other and further objects, features and advantages of the present invention are readily apparent from the foregoing and will be further readily apparent to those skilled in the art when the following description of the preferred embodiments is read in conjunction with the accompanying drawings.

BRIEF DESCRIPTION OF THE DRAWINGS

FIG. 2 is an illustration of a specific environment in which the preferred embodiment of the present invention is deployed for replicating indirect fire support.

FIG. 3 is a block diagram of a master station and three remote actuators operating to define and communicate with an affected geographical zone within a target area.

FIG. 4 is a functional block diagram of the preferred embodiment of the master station.

FIG. 5 is a functional block diagram of the preferred embodiment of one of the remote actuators.

FIG. 6 is a more detailed functional block diagram of the remote actuator shown in FIG. 5.

FIG. 7 is a functional block diagram of the preferred embodiment of an indicator unit of the present invention.

FIG. 8 is a more detailed block diagram of the indicator unit shown in FIG. 7.

FIGS. 9A-9D are diagrams showing different modes of operation of the preferred embodiment of the present invention.

FIG. 10 shows a time line depicting the interrelationship of the operations of the preferred embodiment of the present invention and the indirect fire whose effectiveness is to be simulated.

FIGS. 11A-11C show block diagrams of the system timing.

DETAILED DESCRIPTION OF THE PREFERRED EMBODIMENTS

Figure 1:
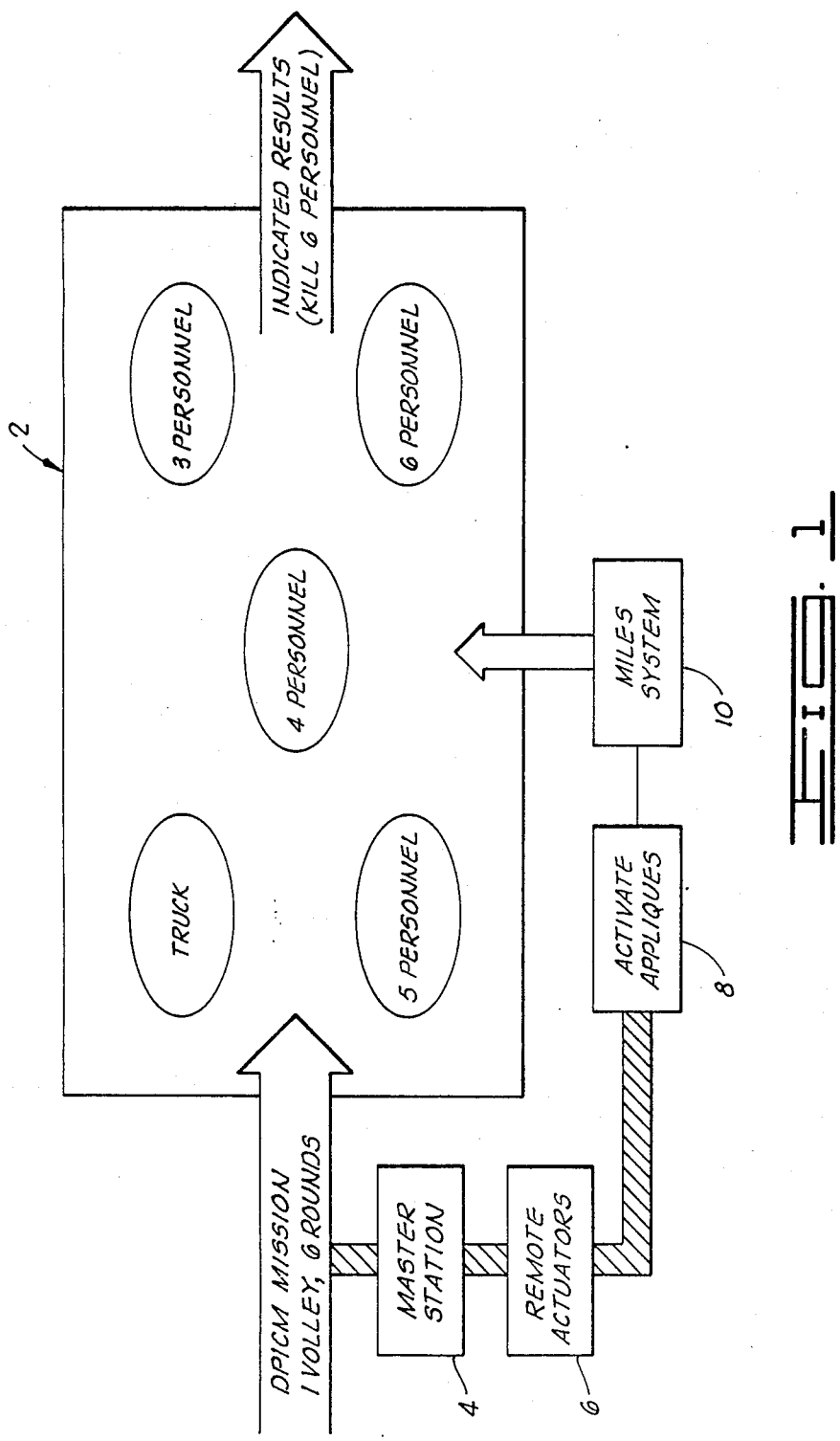
FIG. 1 is a block diagram of the preferred embodiment of the present invention shown with an exemplary target area and an exemplary ammunition.

With reference to the drawings, the preferred embodiment of the present invention will be described. Initially, FIG. 1 depicts an actual geographical zone 2 across which the indicated point targets comprising eighteen personnel and one truck are dispersed. In the zone 2 of the target area there is to be replicated the firing of one volley (six rounds) of a selected type of ammunition, specifically shown as a dual purpose improved conventional munition (DPICM). The effect these six rounds are to have on the personnel and the truck located in the zone 2 is simulated by the present invention shown in FIG. 1 as including a master station 4, remote actuators 6, and indicators 8, which indicators 8 of the preferred embodiment are applied to the indicator/disabling units of a MILES system 10 known to the art (therefore, the indicators 8 are sometimes referred to herein as "appliques" in that they are "applied" to the MILES system 10). Therefore, the preferred embodiment of the present invention emulates computed munitions effects at the point of impact for fire support munitions. In the preferred embodiment, these effects are based on information from the Joint Munitions Effectiveness Manuals. This emulation is implemented by the master station 4 and remote actuators 6 using radio frequency energy to activate the appliques 8.

FIG. 2 illustrates the preferred embodiment apparatus deployed in an actual training environment for the purpose of simulating the effect of ammunition fired from an ammunition firing device (e.g., a weapon 12) at a target area 14. In this embodiment the master station 4 is located within a wheeled vehicle 16 located near the firing location of the weapon 12. The remote actuators 6 are located in wheeled vehicles 18, 20, 22, which are spaced from each other and in between the master station and the target area 14. The master station is operated by an individual within the vehicle 16, whereas the remote actuators 18, 20, 22 do not need any operating personnel because they could be fully automatic in responding to the control signals transmitted from the master station 4. The operator within the vehicle 16 responds to firing information computed such as by a soldier 24 giving firing commands to the weapon 12.

FIG. 3 shows that by using at least three remote actuators, radio waves 26 transmitted therefrom sweep across, or cover, (sequentially in the preferred embodiment) a common area to define a more elliptical, rather than a more linear, area which more realistically defines the shape of the coincident geographical zone (or area on the ground) affected by the fire support replicated by the present invention. In FIG. 3, the master station 4 is shown communicating by electromagnetic waves 28 (specifically radio waves in the preferred embodiment) with three remote actuators 30, 32, 34, which represent the remote actuators located within the vehicles 18, 20, 22, respectively. Through this communication, the actuator 34 propagates a first actuation signal at a time T, followed by an actuation signal from the remote actuator 32 at time T+1, and a third actuation signal from the actuator 30 at time T+2, which operation will be more particularly described hereinbelow.

The master station 4 is shown in FIG. 4 as including a radio 36 for receiving data, such as from the soldier 24 at the fire direction center controlling the weapon 12 shown in FIG. 2. In the preferred embodiment, the radio 36 is any suitable type known to the art, such as of a type presently used by the United States military. The data, which can be conveyed by voice or by digital signals, includes at least the type of ammunition whose firing from the weapon 12 is to be replicated and the coordinates of the target area 14.

The radio 36 is connected to a processor 38 through a suitable interference device 40. The processor 38 is any suitable computing mechanism, such as a microcomputer of a type manufactured by IBM, Xerox, or other suitable type. Associated with the processor 38 is a data storage device 42 of any suitable type capable of storing the information needed by the processor 38.

In response to the data input through the radio 36 and the data stored in the data storage 42, the processor 38 generates suitably encoded control signals transmitted as encoded radio waves by a radio 46, which can be the same as or different from the radio 36, connected through an interface 44. Also associated with the processor 38 are a keyboard 48, a display screen 50 and a printer 52 of types as known to the art.

The elements 36, 38, 40, 42, 44, 46, 48, 50, 52 are mounted within the vehicle 16 to provide a compact, unified, transportable master station. To power these elements, the power from the vehicle 16 can be used. Other suitable power sources, such as commercial power, portable generators, or batteries can be used. Such power is connected to a suitable power distribution unit 54 for driving a power supply 56 providing power signals at the appropriate voltage levels for use by the elements 36-52.

The elements 36-56 are contemplated to be of types commercially available so that the developmental and maintenance costs of the preferred embodiment of the present invention can be reduced. The processor 38 is programmed in any suitable manner for correlating the input data for computing the resulting control signals. The control signals are further developed based upon the selected target area known through the data entered via the radio 36. Thus, the master station provides the planning, coordinating, timing and actuator selection functions for the overall system of the preferred embodiment of the present invention. Once these functions are performed and the control signals generated, they are transmitted. In the preferred embodiment, transmission is contemplated to be at a power not greater than ten watts and the range of the master station is contemplated to be approximately twenty miles.

The construction of one of the remote actuators 30, 32, 34 is shown in FIG. 5. Each remote actuator includes a radio or other radio frequency receiver device 58 of a suitable type known to the art. The radio 58 receives the control signals from the master station 4 and provides them to a processor/encoder 60 through an interface 62. A standardized timing source 64 allows each processor/encoder 60 to generate an actuating signal, for transmission through a transmitter 66, in response to both the timing signal from the timing source 64 and the timing and target information (type of munition) conveyed to the remote actuator from the master station 4. Power for the remote actuator is shown in FIG. 5 as being provided from a generator 68 through a power distribution circuit 70; however, any other suitable type of power can be used to operate the remote actuator. For example, battery or solar power can be used so that the remote actuator can be located in a remote, isolated location and left unattended to automatically operate in response to the control signals from the master station 4.

A more detailed description of one of the remote actuators is shown in FIG. 6. FIG. 6 shows that the remote actuator includes a single antenna 72 switchably connectable to either a receiver 74 or the output of a band pass filter 76, which filter forms part of the transmitter 66. As illustrated in FIG. 6, the receiver 74 is the same type used in the indicator units 8, and it provides its signal to a decoder/timing circuit 78. The circuit 78 is controlled by a microprocessor controller 80 to provide a signal to an encoder/timing circuit 82 providing an output which is modulated through a modulator 84 by a radio frequency from a radio frequency source 86. The modulated signal is amplified by an amplifier 88 before being output through the band pass filter 76. To enable the remote actuator to be controlled by an operator who might, but need not be, located thereat, a keyboard 90 and a display 92 are also shown in FIG. 6 as being associated with the microprocessor controller 80. The microprocessor controller 80 also includes an interface input 94 for receiving external control signals, such as from the global positioning system which can be utilized to locate the remote actuator as it is moved from place to place.

Contemplated features of the remote actuator are that it is to be small, rugged, highly portable and easy to operate. Preferably, it should be of a size which can fit in a portable carrying case. Correspondingly, its weight should be relatively light, such as less than fifteen pounds. The electronics should be selected so that they can be energized by any suitable power source, such as the battery within the vehicle in which it can be mounted as shown in FIG. 2. To conserve such power, the transmitter power output should also be kept low, such as to ten watts. The carrying case should also accommodate the antenna which can have a magnetic mount or a fixed mount for easy assembly when the remote actuator is positioned at its remote location. Furthermore, the preferred embodiment of the remote actuators as well as the indicator units, is preferably implemented with the surface acoustic wave technology available through Motorola, Inc. to enhance the operation of the present invention.

The preferred embodiment of one of the indicator units 8 is shown in FIG. 7. Each unit includes a receiver 96 which provides a signal to a detector/decoder 98. The detector/decoder 98 communicates with the MILES disabling unit through an interface 100. These elements are powered by a battery 102.

FIG. 8 shows a more detailed block diagram of the elements 96, 98, 100. The elements shown in FIG. 8 are types as known to the art with the surface acoustic wave (SAW) device 104 and the XN device 106 being members of the Motorola, Inc. 68000 series of chips known to the art.

A timing/decoder logic circuit 108 can be switchably, or otherwise, variable by a type code plug 110 to specify the nature of the object with which the indicator is associated. For example, the type code plug 110 can be set to define the object as a person or as a truck or any of a plurality of other objects. When the timing/decoder logic circuit 108 determines for that selected type of object that it has been hit by the replicated ammunition, it generates a hit control signal which in the preferred embodiment causes the MILES disabling unit to disable the weapon of the object. If the object is not hit, a near miss signal is provided so that the object is advised it has been in the affected zone but not hit.

The disabling unit of the MILES system is of a type as known to the art and will not be more particularly described. Since it is of known type, the interface provided through the timing/decoder logic circuit 108 is of a suitable type for providing the needed inputs to activate the disabling unit of the MILES system carried on each object.

A 100-megahertz reference clock 111 permits a ten-food resolution within the affected zone.

Each indicator unit of the preferred embodiment of the present invention is contemplated to be constructed in a compact size at a weight of less than one pound so that it can be easily carried by personnel without affecting the performance of the personnel during a training exercise. Since there are to be many indicator units used throughout the target area, and such use is to be in the field in the preferred embodiment, the indicator units should also be durably constructed, but at a relatively low cost. In the preferred embodiment, power is provided by two C-size lithium batteries and the antenna is provided by a monopole antenna either attached to the indicator unit or sewn in as part of the harness used with the MILES disabling unit.

As previously mentioned, the specific electronic components used to implement the master station 4, the remote actuators 6 and the indicators or appliques 8 are of conventional type known to the art. Of particular importance, however, in selecting specific devices for implementing the preferred embodiment are the frequency at which the preferred embodiment of the present invention is to operate and the signal-to-noise considerations. With respect to the frequency at which the selected devices should cause the preferred embodiment to operate, a frequency that provides relatively accurate electronic line-of-sight propagation should be selected. The frequency should also be capable of penetrating foliage and otherwise having low losses within the environment within which the present invention can be used. However, it should provide a degree of battlefield realism by exhibiting some propagation anomalies. The frequency should have a wide bandwidth associated therewith for providing high resolution and multi-path protection. While achieving these technical requirements, the frequency selection should also permit the indicator units to be constructed at a low cost with readily available, low cost devices. Furthermore, the selected frequency must be compatible with others who are using the same frequency band.

We have determined that one suitable range of frequency is within the range between approximately 100 megahertz and approximately 1,000 megahertz. One analysis indicates that the specific frequency of approximately 915 megahertz, with a 20-megahertz bandwidth, meets the aforementioned technical requirements as well as the cost requirements. Furthermore, this specific frequency and bandwidth can be used for positioning-type systems, and they allow for ten watts to be used without special authorization. This band is used by industrial, scientific and medical equipment, but use of coding in the present invention can protect the present invention from incidental interference with these other uses. Furthermore, the low power and duty cycling operation which can be implemented in the present invention prevent or reduce the chance of interference by the present invention with these other uses.

The importance of the signal-to-noise considerations is that a relatively high light of noise can be encountered by the present invention in the replicated battlefield environments in which it is contemplated that the preferred embodiment will be used. Therefore, a suitable signal-to-noise ratio should be designed into the system. For example, it is contemplated that the preferred embodiment will have signal-to-noise ratios of approximately 40 dB; however, minimum ratios of approximately 20 dB may also be acceptable in the preferred embodiment to be used in replicated battlefield environments. To further preclude noise interference, actuations of the devices within the preferred embodiment are to occur at the leading edge of the control signals at a threshold suitably above the anticipated noise level so that actuations occur before otherwise interferring multi-path responses occur and not as a result of noise.

In addition to the foregoing aspects of the present invention, it is contemplated that additional elements can be incorporated with the master station 4, the remote actuators 6 and the indicator units 8 to provide realism of the battlefield while maintaining safety to personnel and equipment. For example, visual simulations can be effected through the use of smoke cannisters, flashing lights and small smoke cartridges. Audible simulation of explosions can be created with electro-acoustic transducers, compressed air, small charges, or lightweight headsets to which simulated sounds of explosions can be provided. Sound synthesis techniques can be used with the indicator units 8, and the volume can be varied as a function of the distance the specific object is from the computed impact location.

With reference to FIGS. 9A–9D, different modes of operation of the preferred embodiment of the present invention will be described. In FIG. 9A, the normal mode is illustrated. In this mode, a master station 112 communicates directly with each of three remote actuators 114, 116, 118. The remote actuators 114, 116, 118 in turn each transmits an actuating signal to be received by an indicator unit 120 located within the affected zone of the target area.

In a relay mode of operation illustrated in FIG. 9B, a master station 122 communicates directly only with a remote actuator 124. The remote actuator 124 then provides controlling communications to two other remote actuators 126, 128. Each of the actuators 124, 126, 128 then generates its own actuating signal to an indicator unit 130.

A multiple relay mode is illustrated in FIG. 9C. A master station 132 communicates with an intermediate remote actuator 134 and an intermediate remote actuator 136. The actuator 134 then provides controlling communication to remote actuators 138, 140, which in turn communicate with an indicator unit 142. The actuator 136 communicates with a remote actuator 144 which is the third actuator in communication with the indicator unit 142.

FIG. 9D depicts a polling/calibration mode in which the indicated signals are conveyed between a master station 146 and remote actuators 148, 150, 152. One use of this mode is to insure that all the standardized timing sources 64 within the remote actuators are synchronized.

With reference to the exemplary environment illustrated in FIG. 2, and further with reference to FIGS. 10, 11A-C and 12A-B, the operation of the preferred embodiment of the present invention will be described. As shown in FIG. 10, initially a forward observer calls in fire on coordinates X, Y, which designate the target area 14. The information from the forward observer is processed at the firing unit, such as by the person 24, and the decision is made to fire the weapon 12.

Once the information has been processed and the decision made to fire the weapon 12, the information as to the type and quantity of ammunition and the location of the target area to be fired upon is conveyed to the weapon 12. This same information is received by the present invention through a communication link, which in the preferred embodiment is by a person in the vehicle 16 receiving verbal communications over the radio 36 and then inputting the information into the processor 38 or by direct communication of digital signals into the radio 36 and on into the processor 38.

When the processor 38 receives the information through the communication link (and any other input, examples of which are designated in FIG. 10), the processor 38 determines the optimum remote actuators for defining the affected zone through the radio waves sequentially transmitted from the selected actuators. The processor 38 also calculates the timing sequence of the selected remote actuators. The selection of the actuators and the timing sequence is shown in FIG. 10 as taking approximately 20 milliseconds of processing time in the processor 38. Once this information has been determined, the processor 38 enters a wait or delay mode.

The operator in the vehicle 16 continues to monitor the firing sequence of the weapon 12 so that when the fire command is given, the operator can actuate the processor 38 to commence its transmission sequence at a suitable time accounting for the computed time of the replicated flight of the ammunition (which, of course, is not actually fired into the selected target area). At the appropriate time, the processor 38 transmits its control signals to the remote actuators, which in turn sequentially transmit their actuating signals to the indicator units 8 for activation at the projected time of impact. By using at least three remote actuators to send actuating signals to the target area, a substantially elliptical zone will be commonly covered at different times by each of the remote actuator's signal during its respective transmission time. This zone is a realistic replication of the zone that would actually have been covered by the selected ammunition had it actually been fired into the target area. Such a replicated zone would not be defined by only one or two remote actuators.

In actuating the indicator units 8, the preferred embodiment of the present invention selects which ones will constitute the total number of "kill" or "hit" items, which number is based upon the Joint Munitions Effectiveness Manuals. For those indicators which generate a "hit" signal, the indicator unit provides a suitable signal to the interfaced MILES disable unit to disable the weapon associated with the "hit" object. Visual and audible signals can also be simultaneously provided so that the individual objects are immediately notified of their status and so that observers can make the necessary damage assessment and call for additional replicated fire if required.

The sequential timing sequences for the different modes of operation are shown in FIGS. 11A-11C. For example, in FIG. 11A, it takes approximately ten milliseconds in the preferred embodiment for the master station to transmit the information to the actuators. This corresponds to the "transmit to actuators" block shown in FIG. 10. FIG. 11A also shows the sequential transmission allotted to each of five remote actuators. This corresponds to the "transmit to appliques" block shown in FIG. 10. FIGS. 11B and 11C are self-explanatory.

Figure 12B:
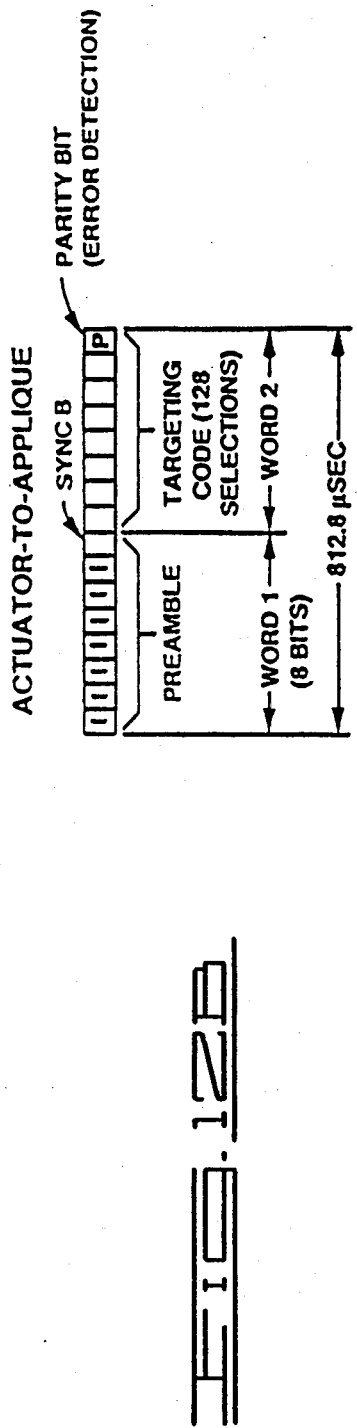
FIGS. 12A-12B depict the message structure between the master station and remote actuators and between the remote actuators and the indicator units.
Figure 12A:
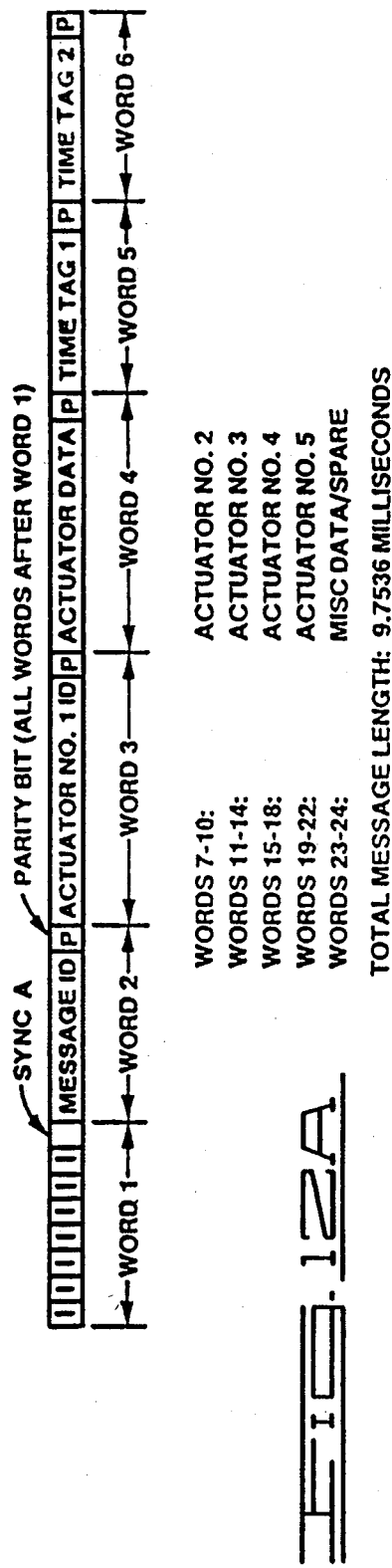

The message structures within the transmissions between the master station and the remote actuators and between the remote actuators and the indicator units are shown in FIGS. 12A and 12B, respectively. FIG. 12A shows the master station to actuator message structure encoded in the master control signals transmitted from the master station 4 and used during the approximately ten-millisecond communication time between the master station and the actuators indicated in FIGS. 10 and 11A-C. As shown in FIG. 12A, the message structure includes identification for each actuator, and corresponding target (munition code) and time data used by the remote actuators in generating the actuating signals.

FIG. 12B shows that the principal portion of the actuator to applique message structure encoded in the actuating signals transmitted from the remote actuators 6 is the targeting code which actuates a logic circuit within the decoder 108 resulting a in a signal of a "hit" or a "near miss."

In the preferred embodiment, information conveyed by each remote actuator can be different so that the indicator units can be sequentially instructed, whereby an indicator unit will "know" it is not within the affected zone if the entire sequence of instructions is not received in the proper order.

In summary, the preferred embodiment of the present invention utilizes a single frequency, time-division multiplex transmission technique implemented through the same type of ten-watt transmitters in the master station and the remote actuators. The transmissions provide control signals which ultimately actuate indicator units designating which objects within an affected zone have been "hit" and which have been "near misses." The technique uses a suitable coding for providing good resolution and multi-path performance. A single master station controls all of the system timing and external interfaces to select optimally located remote actuators to appropriately cover the target area with radio waves to realistically define the affected zone.

The system can replicate fire to a plurality of targeting points each second and can simulate the effect of the replicated fire on multiple targeted objects so that multiple actions which can occur substantially simultaneously on a battlefield can be realistically simulated.

The system can be operated in a calibration mode to insure that all remote actuators are properly operating from a standard timing source contained within each remote actuator. The system can also be operated in a relay mode so that a target area covered by remote actuators which are not in the electronic line of sight of the master station can be controlled by intermediate or relaying remote actuators which are in electronic line-of-sight communication with the master station.

Furthermore, the present invention complements the MILES system by utilizing low cost, lightweight indicator units interfaced with the portions of the MILES system mounted on the personnel and equipment within the target area. The remote actuators, which communicate directly with the indicator units, are portable and can be located in isolated areas to operate from vehicular batteries or other power sources. The remote actuators can be non-stationary with instantaneous locations being determined through an interface with the global positioning system or other position determining device.

The preferred embodiment of the present invention is contemplated to be constructed of conventional electronics, but selected and assembled to operate at an appropriate frequency and to provide excellent signal-to-noise ratios for reliable operation even in high-noise environments such as a replicated battlefield. The preferred embodiment also incorporates surface-acoustic-wave devices of types known to the art to provide simple, effective signal processing; however, any suitable timing device can be used.

Therefore, the present invention solves a major fire support deficiency whose solution has been a high priority of the United States military. The present invention solves this deficiency in a relatively simple manner using relatively low risk, currently available technology. The present invention is relatively low cost and uses a minimum of limited resources of the military. Thus, the present invention is well adapted to carry out the objects and attain the ends and advantages mentioned above as well as those inherent therein. While preferred embodiments of the invention have been described for the purpose of this disclosure, numerous changes in the construction and arrangement of parts and in the performance of steps can be made by those skilled in the art, which changes are encompassed within the spirit of this invention as defined by the appended claims.

To more specifically define the specific embodiment contemplated for the present invention, the following description is given. This description explains the nature of the signals provided by the master station and the remote actuators, and it explains the contemplated operation of specific appliques and the associated MILES sensor/disabling unit, if any.

The master station generates the master control signal in response to the type and quantity (e.g., number of rounds) of ammunition whose fire is to be replicated and in response to the coordinates of the selected target area. Part of the master control signal is coded to instruct the remote actuators on when and how long to emit their respective pulses, which pulses define the actuating signals generated by the remote actuators. When the pulses are to commence is based on the respective locations of the actuators to the target area; the length of time is based on the type of ammunition, and it determines the size of the affected zone in the target area (i.e, longer duration pulses from the actuators define a larger elliptical area than do shorter duration pulses). Still another part of the master control signal instructs the remote actuators on how many of the pulses are to be emitted from the remote actuators, this is based on the quantity (e.g., number of rounds) of ammunition. A further part of the master control signal is the identification of the remote actuators that are to be used in communicating to the target area to define the affected zone; this is based on the location information received by the master station. Because many remote actuators can be placed throughout a wide area, the optimum ones of these actuators for covering the specific target location are selected and instructed by the master control station as just described.

Having received the foregoing information through the master control signal, the remote actuators generate the required pulses at the appropriate times, as synchronized from the standard timing sources within each actuator. Each pertinent remote actuator encodes its respective pulse or pulses with a preamble identifying the remote actuator and with targeting code information identifying the type of ammunition "fired" into the target area. Thus, each remote actuator sends the same targeting code information to the target area. In the contemplated specific embodiment, any one of 128 different types of munitions can be encoded in the actual signal.

The actuating signals from the pertinent remote actuators sweep across the target area as they are generated, thereby defining the substantially elliptical zone. It is contemplated that within this zone, the appliques will receive and response to actuating signals received within a timing window, such as from three consecutive remote actuators; if an applique does not, it is not affected. That is, if only three remote actuators are designated in the timing sequence $A^1$, $A^2$, $A^3$ by the master control station to be within the window, an applique will not respond unless it receives the actuating signals, in order, from $A_1$, $A_2$, $A_3$. If five actuators sequenced as $A_1$, $A_2$, $A_3$, $A_4$, $A_5$ are designated, for example, then an applique responsive to three timing pulses within the window will respond only if it receives in order the signals from $A_1$, $A_2$, $A_3$ or from $A_2$, $A_3$, $A_4$ or from $A_3$, $A_4$, $A_5$.

Figure 13:
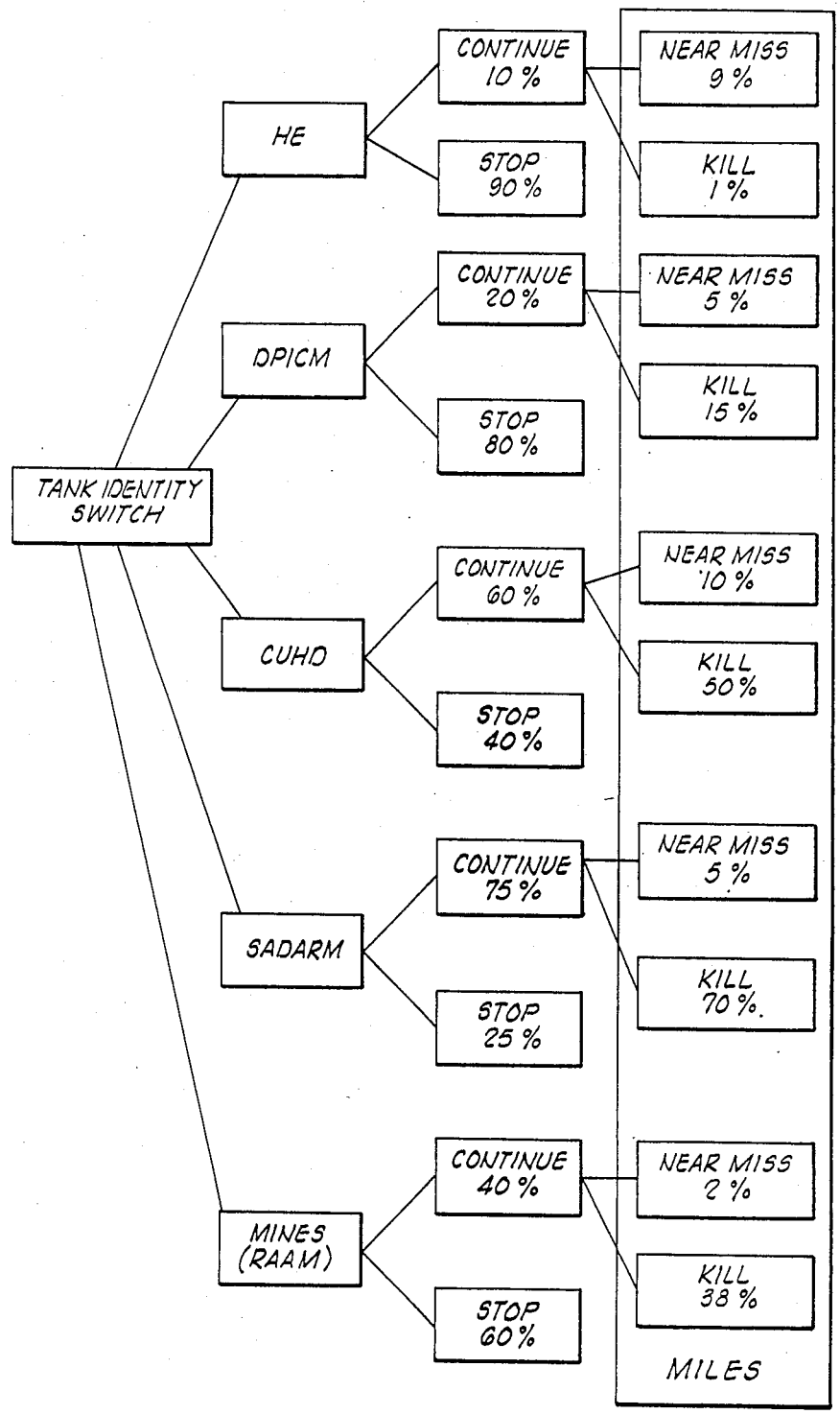
FIG. 13 is a block diagram of a large circuit implementated in the indicator units.
Figure 14:
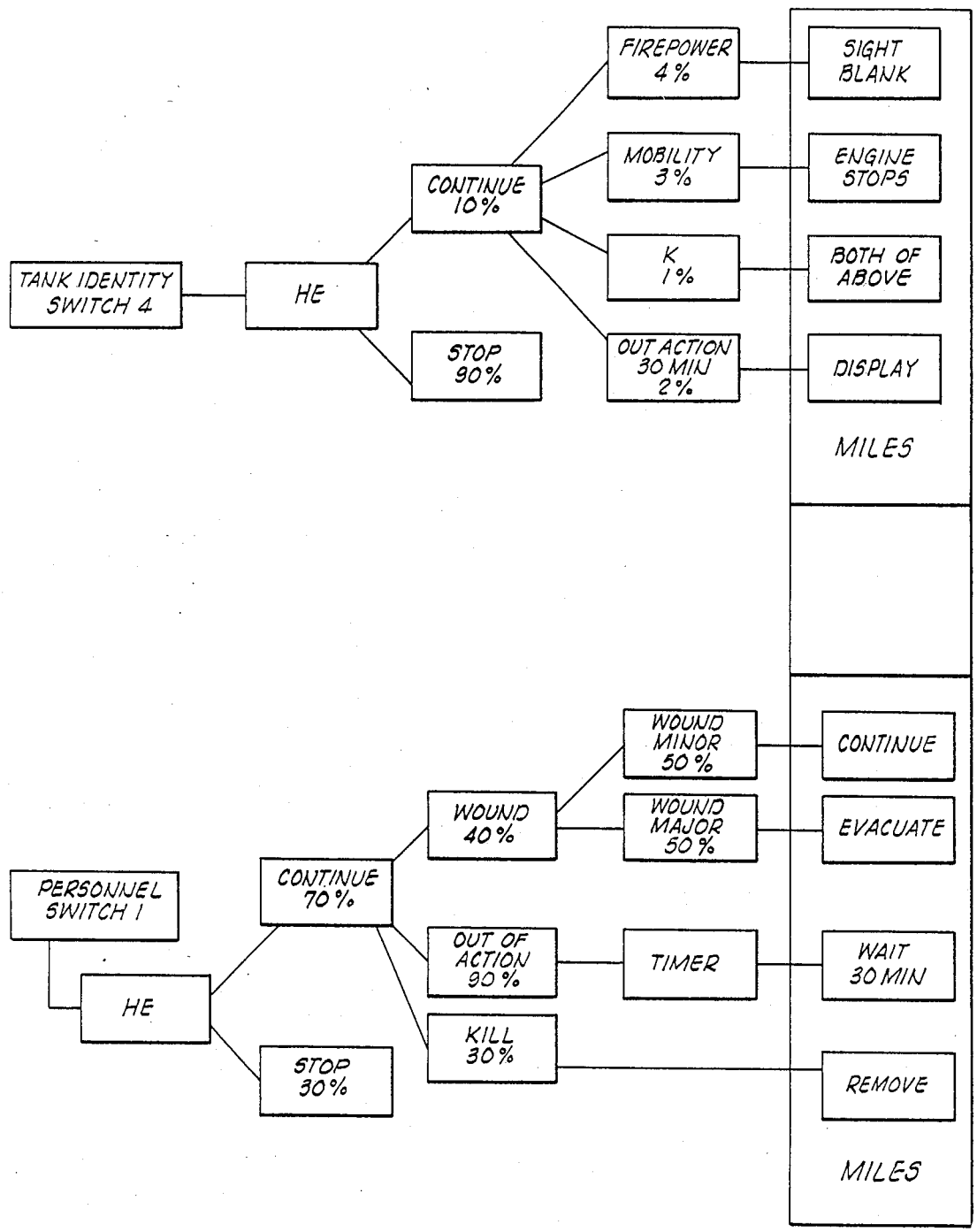
FIG. 14 illustrates contemplated enhancements for use with the indicator units and the MILES system.

Assuming an applique receives the appropriate actuating signals, this activates a logic circuit such as may be implemented by a suitably programmed eraseable programmable read only memory (EPROM). In the specific embodiment, this programming is based on the known percentages set forth in the Joint Munitions Effectiveness Manuals; however, other information can be used in programming or constructing the logic circuit. Whatever basic information is used, the purpose of the contemplated specific embodiment of the appliques is to create an output based on the probabilities of the object carrying the applique being hit by the type of ammunition "fired" into the target area. A flow chart or block diagram of this logic circuit is illustrated in FIG. 13. This figure shows an applique has been set to be a tank. Five types of ammunition (HE, DPICM, CUHD, SADARM, MINES) are shown, and the probabilities for each are listed. These probabilities are implemented within the programming or circuitry. Finally, the MILES sensors/disabling unit is indicated as capable of displaying a "near miss" or a "kill." For example, if a high explosive (HE) round is "fired," there is a 10% probability that the tank will be affected by this. Therefore, approximately 10% of the time (over a long term) the logic circuit will continue on, selecting whether the tank has been a "hit" or a "near miss." When this ultimate decision has been made a suitable signal is provided to the MILES system to display "kill" or "near miss." Because the logic circuit within each applique located in the affected zone operates independently of the other appliques' logic circuits, the simulated effect at any one time is random. For example, all of the logic circuits may independently coincide on all "hits" or on all "near misses" to show that everything has been killed or that none have, respectively. The combinations between these extremes are also possible.

From the foregoing, it is apparent that the specific embodiment implements the "hit" or "miss" decision-making at the target area. This configuration permits the same type of appliques to be used throughout, and it simplifies the control and actuating signals in that they do not need to specifically address individual appliques to inform them that they have been hit or missed. Furthermore, this obviates the necessity of stroing larger data bases which would likely be needed if the "hit" and "miss" decisions were made upstream.

What is claimed is:

1. A portable indicator apparatus for detecting when an object at a target area has been hit by replicated indirect ammunition fire, comprising:
   radio frequency receiver means, attachable to the object, for receiving a plurality of radio frequency actuating signals;
   decoder means for determining whether the object has been hit when the radio frequency actuating signals are received by said radio frequency receiver means, said decoder means including:
      logic circuit means, connected to said radio frequency receiver means, for programming said apparatus with a plurality of probabilities for a predetermined type of object being hit, wherein each of the probabilities is assigned to a respective type of replicated indirect ammunition fire, so that in response to radio frequency actuating signals received by said receiver means and encoded to designate at least one type of replicated indirect ammunition fire said logic circuit means determines whether the object has been hit by the encoded type of replicated indirect ammunition fire; and
   means, responsive to said decoder means, for signifying when the object has been hit by the replicated indirect ammunition fire.

2. An apparatus as defined in claim 1, wherein said decoder means includes means for variably specifying the predetermined type of object.

3. An apparatus as defined in claim 1, wherein said means for signifying includes:
   disabling means for electronically disabling a weapon associated with the object when the object has been hit by replicated direct ammunition fire; and
   interface means for interfacing said decoder means and said disabling means so that said disabling means is caused to disable electronically the weapon associated with the object in response to said decoder means determining the object has been hit by the replicated indirect ammunition fire.

4. An apparatus as defined in claim 3, wherein the direct ammunition fire is replicated by a laser beam.

5. An indicator apparatus for detecting when an object with which said indicator apparatus is associated at a target area has been hit by replicated munition fire, comprising:
   receiver means for receiving at the object a timed sequence of actuating signals each encoded to specify the type of munition of the replicated firing;
   decoder means connected to said receiver means for making, at the target area and in response to said receiver means receiving the actuating signals in the timed sequence and independently of any other said indicator apparatus within the target area also receiving the actuating signals in the timed sequence, a probability based decision as to whether the object is to be indicated as having been affected by the replicated munition fire; and
   means connected to said decoder means for signifying when the object is to be indicated as having been affected by the replicated munition fire.

6. An apparatus as defined in claim 5, wherein said decoder means includes read only memory means for storing information defining a probability that the object will be affected by a respective type of munition.

7. An apparatus as defined in claim 5, wherein said decoder means includes logic circuit means, connected to said receiver means, for programming said apparatus with a plurality of probabilities for a predetermined type of object, wherein each of the probabilities is assigned to a respective type of replicated munition fire, so that in response to the actuating signals received by said receiver means said logic circuit means determines whether the object is to be indicated as having been affected by the replicated munition fire.

8. An apparatus for indicating at least one effect of a plurality of possible effects which could result from an event, comprising:
   receiver means for receiving at least one actuating signal encoded to define at least one variation of a variable feature of the event upon which the possible effects depend;
   decoder means, connected to said receiver means, for determining whether at least one of the possible effects is to be indicated as having occurred in response to the at least one variation of the variable feature defined by the at least one actuating signal being received by said receiver means, said decoder means including:
      logic means for programming said apparatus with probabilities of the possible effects occurring in response to the variable feature, wherein each of the probabilities is assigned to a respective variation of the variable feature, so that said logic means determines whether at least one of the possible effects occurs in response to the at least one actuating signal being received by said receiver means; and
   means, responsive to said decoder means, for signifying when at least one of the possible effects is determined to occur.

* * * * *

UNITED STATES PATENT AND TRADEMARK OFFICE
CERTIFICATE OF CORRECTION

PATENT NO. : 4,744,761
DATED : May 17, 1988
INVENTOR(S) : Stephen Doerfel et al.

It is certified that error appears in the above-identified patent and that said Letters Patent are hereby corrected as shown below:

Column 6, line 7, change "selection" to --selecting--;
Column 7, line 44, change "food" to --foot--;
Column 8, line 34, change "light" to --level--; and
Column 12, line 17, change the "," to a --;--.

Signed and Sealed this

Eighteenth Day of October, 1988

Attest:

DONALD J. QUIGG

Attesting Officer　　　　Commissioner of Patents and Trademarks